Nov. 3, 1953  A. L. BARRETT  2,657,863
RAIL JOINT
Filed April 21, 1949
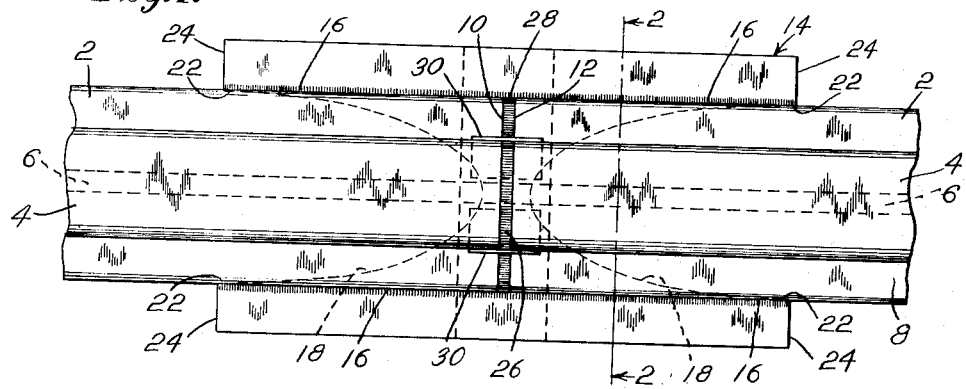
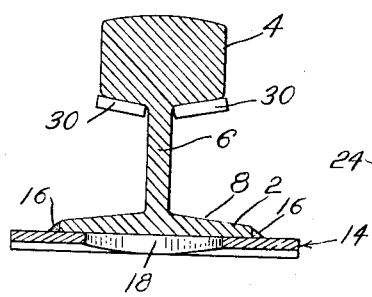
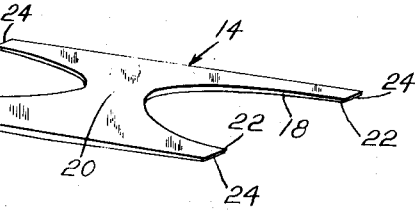
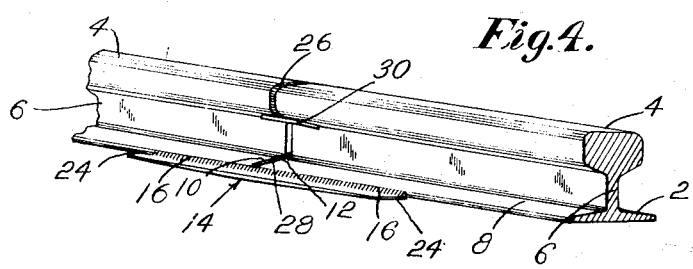
INVENTOR:
ARTHUR L. BARRETT.
BY
John F. Schmidt
ATTORNEY.

Patented Nov. 3, 1953

2,657,863

UNITED STATES PATENT OFFICE 2,657,863

RAIL JOINT

Arthur Lee Barrett, Franklin, Pa.

Application April 21, 1949, Serial No. 88,769

7 Claims. (Cl. 238—164)

This invention relates to a rail joint, especially to a welded rail joint.

In joining rail ends together by welding, it is customary to use a plate under or alongside the rails at the place where the two ends come together, and to weld the rail ends to the plate. It has been found that conventional rail joints have the disadvantage of causing stress concentrations where the reinforcing plates end, causing the rails to break at these points.

It is, accordingly, an object of this invention to provide a welded rail joint in which the plate to which the rail ends are welded is so designed as to provide a distribution of stresses that avoids concentrations sufficient to cause failure of the rail. This and other objects are accomplished in a plate which is wider than the rail, which is recessed at its ends, the recesses diverging toward the ends of the plate and being at their open ends, in an ideal embodiment, of the same width as the portion of the rail to which the plate is secured, and which is tapered from a maximum thickness at a point between the rail ends to a minimum thickness at the ends of the plate where the recesses are of maximum width. The joint is furthermore preferably made with the rail ends spaced apart and the space thus provided being at least partially filled with weld metal.

In the drawings:

Fig. 1 is a top plan view of a rail joint made according to the invention.

Fig. 2 is a view in section on line 2—2 of Fig. 1.

Fig. 3 is a perspective view of the recessed plate of a joint made according to the invention, and Fig. 4 is a perspective view of a completed rail joint made according to the invention.

The invention is shown as being applied to a pair of conventional rails 2 having the usual head 4, web 6 and base 8. The two rails 2—2 are laid end-to-end, preferably with the end 10 spaced somewhat from the end 12. A plate 14, wider than the base 8, is welded as at 16 to the under side of the base 8 of each rail 2.

Plate 14 is recessed as shown at 18. The recesses are provided in the ends of the plate and diverge from near a point 20 substantially midway between the ends to a maximum width at the ends of the plate. The maximum width of the recess is substantially the same as the width of the base 8. Ideally, the maximum width of the recess would be exactly the width of the base. However, such a structure might require undue care in alinement of the plate with the base at the time of welding, so for practical reasons the recess may be made something like a half inch narrower than the base to permit a quarter of an inch misalinement either way.

The recesses are preferably curved as is best seen in dotted lines in Fig. 1, the curve being a smooth one and providing for a gradual increase in the width of the recess. It should further be noted that at the very ends of the plate the curve is preferably tangent to the edge of base 8, as shown at 22. It is further noted that the plate 14 is preferably tapered from a maximum thickness at the point 20 to a minimum thickness at the plate ends as shown at 24, and that the taper is present throughout the entire cross-section; see especially Fig. 2.

The purpose of this taper, present in the entire cross-section, is to achieve a gradual, as distinguished from an abrupt or sudden, change in the section modulus as we move from the middle of the joint past either end to the naked rail. The taper cooperates with the recess 18 to provide the desired gradual change. I have found from experience that a recessed plate, not tapered, or a tapered plate, not recessed, does not furnish the gradual change needed for a completely satisfactory joint—i. e., one not subject to fatigue failure—although of course some of the advantages of the invention can be realized in a joint possessing only the taper or only the recesses.

The rails are preferably placed with their ends 10 and 12 spaced apart somewhat as was mentioned above. At least a portion of the space between the rail ends thus provided is preferably filled with weld metal as shown at 26 and 28.

A strap 30 is tack-welded to the under side of the rail head 4 in order to provide a "bottom" for the weld metal between the heads of the two rails 2—2. Strap 30 is not intended as a reinforcement, and may be chipped off after welding the heads together, if desired. In the preferred embodiment, two straps 30 will be thus secured to the two rail ends, one at each side of the web 6. It is not thought necessary to the practice of this invention to fill the space between the two webs 6 with weld metal, although this may also be done if desired.

It is thus evident that this invention provides a rail joint in which the plate 14 serves as a support for the rail ends and provides support for those rail ends which diminishes gradually from a maximum between the rail ends to a minimum at the ends of the plate. This diminished support is in the preferred form provided by two expedients, namely the recesses 18 and the taper of the plate thickness from the point 20 to the ends 24. With a joint made according to this invention, the stresses transmitted to the rail by the plate diminish gradually from a maximum between the rail ends to substantially zero at the ends of the plate, thus substantially eliminating the tendency of rails to fracture at the ends of the plate.

While there is in this application specifically described one form which the invention may assume in practice, it will be understood that this form of the same is shown for purposes of illustration, and that the invention may be modified and embodied in various other forms without departing from its spirit or the scope of the appended claims.

I claim:

1. In a rail joint for two rails laid end-to-end, a support for the rails comprising a member wider than the bases and having a recess in each end the sides of which diverge outward in a direction away from the adjacent rail ends, the recesses being at their widest points substantially as wide as the rail bases, said member having a region of maximum thickness at the adjacent rail ends and a gradually decreasing thickness throughout the entire cross-section from said region toward the ends of the member, and a pair of welds securing said member throughout its length to the rail bases.

2. A rail joint comprising two rails having ground-engaging bases and being laid end-to-end, and a member welded to both bases throughout its length and having opposed recesses to provide a contact surface with each base that diminishes gradually in a direction away from the rail end, said member having a region of maximum thickness at the adjacent rail ends and a gradually decreasing thickness throughout the entire cross-section from said region toward the ends of the member.

3. In a rail joint, a pair of rails laid end-to-end and having ground-engaging bases, and a recessed plate underlying said bases and being welded thereto throughout its length, the plate having a recess at each end which diverges in a direction away from the rail end to a maximum width substantially equal to the width of said base, the plate being of a maximum thickness at the rail ends and tapering throughout its cross-section toward its ends.

4. A joint according to claim 3, in which said recess forms a curve which is tangent at its ends to the rail base.

5. A joint according to claim 2, in which each recess forms a curve which is tangent at its ends to the rail base.

6. In a rail joint for two rails laid end-to-end, a support for the rails comprising a flat plate-like member wider than the bases disposed beneath the bases and having a pair of opposed recesses the sides of which diverge outward in a direction away from the adjacent rail ends, the recesses being at their widest points substantially as wide as the rail bases, and a pair of welds securing said member throughout its length to the rail bases.

7. In a rail joint for two rails laid end-to-end, a support for the rails comprising a plate-like member wider than the bases and disposed beneath the bases, said member having a region of maximum thickness at the adjacent rail ends and a gradually decreasing thickness throughout the entire cross-section from said region toward the ends of the member, and a pair of welds securing said member throughout its length to the rail bases.

ARTHUR LEE BARRETT.

References Cited in the file of this patent

UNITED STATES PATENTS

| Number | Name | Date |
|---|---|---|
| 1,171,423 | Gaboury | Feb. 15, 1916 |
| 1,509,474 | Gailor | Sept. 23, 1924 |

FOREIGN PATENTS

| Number | Country | Date |
|---|---|---|
| 83,979 | Sweden | July 30, 1935 |